United States Patent
Resio et al.

(10) Patent No.: US 11,208,980 B1
(45) Date of Patent: Dec. 28, 2021

(54) INTEGRATED SYSTEM FOR OPTIMAL CONTINUOUS EXTRACTION OF POTENTIAL ENERGY DERIVED FROM WAVES

(71) Applicants: Donald Thomas Resio, Ponte Vedra, FL (US); Brian Thomas Kopp, Jacksonville, FL (US); Abdallah Walid Mohamed Kamal El Safty, Jacksonville, FL (US)

(72) Inventors: Donald Thomas Resio, Ponte Vedra, FL (US); Brian Thomas Kopp, Jacksonville, FL (US); Abdallah Walid Mohamed Kamal El Safty, Jacksonville, FL (US)

(73) Assignee: University of North Florida Board of Trustees, Jacksonville, FL (US)

( * ) Notice: Subject to any disclaimer, the term of this patent is extended or adjusted under 35 U.S.C. 154(b) by 0 days.

(21) Appl. No.: 17/249,385

(22) Filed: Mar. 1, 2021

(51) Int. Cl.
  *F03B 13/14* (2006.01)
  *F03B 13/26* (2006.01)
  (Continued)

(52) U.S. Cl.
  CPC ............ *F03B 13/148* (2013.01); *F03B 13/22* (2013.01); *F03B 13/26* (2013.01); *F03B 13/264* (2013.01);
  (Continued)

(58) Field of Classification Search
  CPC ........ F03B 13/148; F03B 13/26; F03B 13/22; F03B 13/264; F15B 15/065; F05B 2210/404
  (Continued)

(56) References Cited

U.S. PATENT DOCUMENTS

| | | | | |
|---|---|---|---|---|
| 3,918,260 A | * | 11/1975 | Mahneke | F03B 13/189 60/500 |
| 4,630,440 A | * | 12/1986 | Meyerand | F03B 13/188 60/398 |

(Continued)

FOREIGN PATENT DOCUMENTS

| | | |
|---|---|---|
| CA | 2910725 A1 | 4/2017 |
| GB | 2454913 A | 5/2009 |

(Continued)

OTHER PUBLICATIONS

International Search Report and Written Opinion for PCT/US2019/035560 (filing date: Jun. 5, 2019) with a dated Aug. 8, 2019; Applicant: University of North Florida Board of Trustees.

(Continued)

*Primary Examiner* — Charles Reid, Jr.
(74) *Attorney, Agent, or Firm* — Smith & Hopen, P.A.; Paul Murty

(57) ABSTRACT

A closed dual-bladder wave energy system that is capable of capturing a continuous supply of energy derived from wave movements for nearshore implementations. Rather than employing an onshore bladder in communication with an offshore bladder, and rather than focusing on capturing more incremental potential energy derived from tidal movement, the system accomplishes continuous captures potential energy from waves via a dual-bladder system employed offshore. Fluid within the system translates between a first offshore bladder and a second offshore bladder based on a pressure differential between a crest and a trough of a wave external to the system. By utilizing compliant bladders, the system is capable of capturing energy even during inclement weather conditions without the risk of faults resulting from strong waves. As such, the system provides for the efficient and effective capture of potential energy from waves in any (Continued)

weather condition and in any water environment that experiences waves.

20 Claims, 7 Drawing Sheets

(51) Int. Cl.
    *F04B 35/00*     (2006.01)
    *F04B 45/06*     (2006.01)
    *F04B 19/22*     (2006.01)
    *F03B 13/22*     (2006.01)
    *F15B 15/06*     (2006.01)

(52) U.S. Cl.
    CPC ............ *F04B 19/22* (2013.01); *F04B 35/004* (2013.01); *F04B 35/008* (2013.01); *F04B 45/06* (2013.01); *F15B 15/065* (2013.01); *F04B 2205/06* (2013.01); *F05B 2210/404* (2013.01)

(58) Field of Classification Search
    USPC ........................................ 290/42, 53; 60/398
    See application file for complete search history.

(56) References Cited

U.S. PATENT DOCUMENTS

| | | | |
|---|---|---|---|
| 4,754,157 A * | 6/1988 | Windle | ................. F03B 13/189 290/53 |
| 7,795,748 B2 * | 9/2010 | DeAngeles | ............. F03B 17/04 290/43 |
| 9,644,600 B2 | 5/2017 | Aldosari | |
| 10,514,020 B1 | 12/2019 | Resio et al. | |
| 10,767,619 B2 | 9/2020 | Kopp et al. | |
| 10,801,466 B1 | 10/2020 | Resio et al. | |
| 2006/0202483 A1 | 9/2006 | Gonzalez | |
| 2010/0107627 A1* | 5/2010 | Morgan | .............. F03B 13/1885 60/495 |
| 2010/0276935 A1 | 11/2010 | Dehlsen et al. | |
| 2011/0081259 A1 | 4/2011 | Vowles | |
| 2015/0211480 A1 | 7/2015 | Pingitore et al. | |
| 2017/0089318 A1 | 3/2017 | Aldosari | |

FOREIGN PATENT DOCUMENTS

| | | | |
|---|---|---|---|
| GB | 2511285 A | 12/2012 | |
| WO | 2019035883 A1 | 2/2019 | |
| WO | WO-2019035883 A1 * | 2/2019 | .............. F03B 13/26 |
| WO | 2020246971 A1 | 12/2020 | |

OTHER PUBLICATIONS

International Search Report and Written Opinion for PCT/US18/00147 (filing date: Aug. 15, 2018) with a dated Jan. 4, 2019; Applicant: University of North Florida Board of Trustees.

International Preliminary Report on Patentability issued by the International Bureau dated Feb. 27, 2020 for corresponding International Patent Application No. PCT/US18/00147.

Extended European Search Report for Application No. 18846005.9 dated Nov. 5, 2020; Applicant: The University of North Florida Board of Trustees.

* cited by examiner

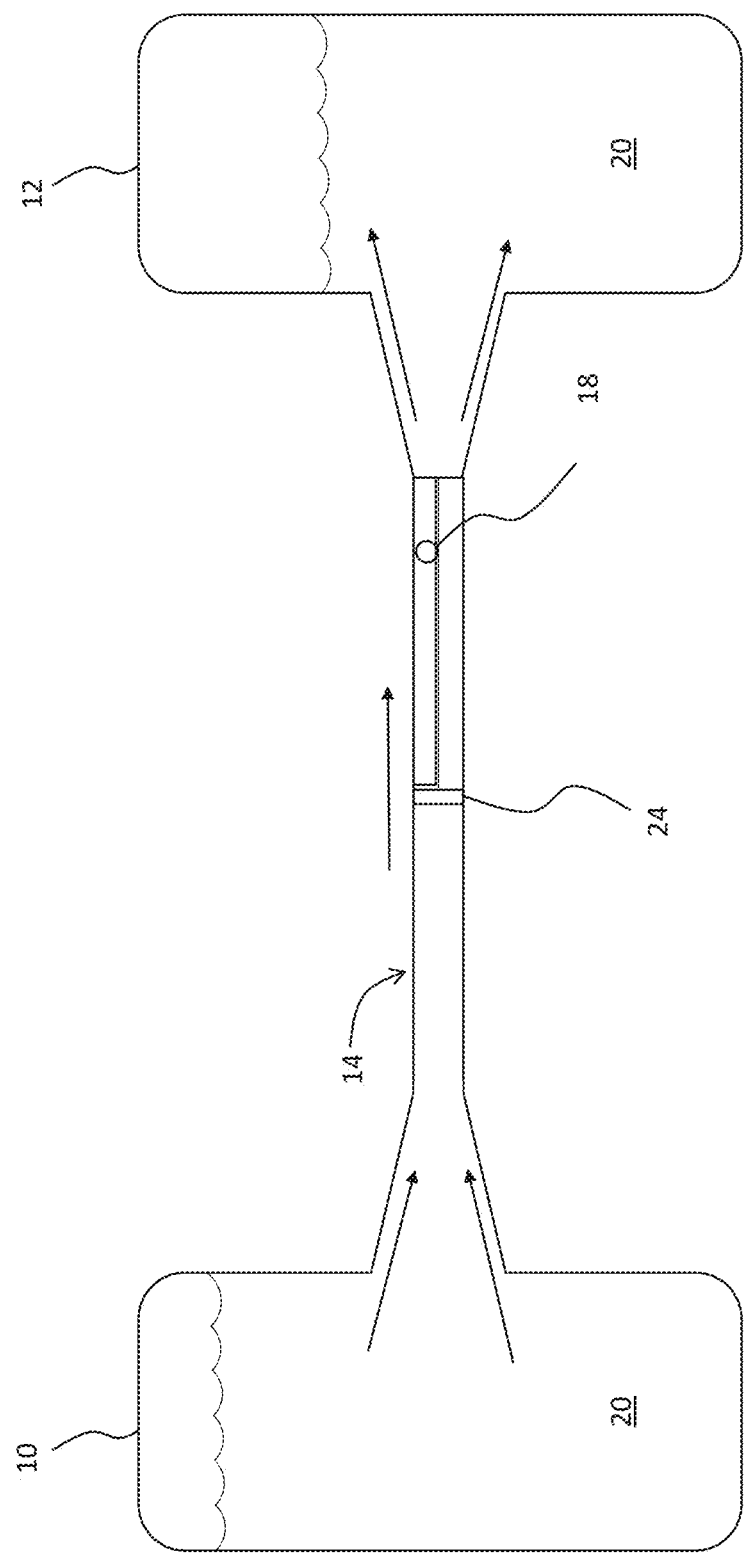

INTEGRATED SYSTEM FOR OPTIMAL CONTINUOUS EXTRACTION OF POTENTIAL ENERGY DERIVED FROM WAVES

BACKGROUND OF THE INVENTION

1. Field of the Invention

This invention relates, generally, to wave energy. More specifically, it relates to closed wave energy systems capable of capturing a continuous supply of energy derived from wave movements for nearshore implementations.

2. Brief Description of the Prior Art

Wind waves represent one of the densest sources of energy on the planet, with wave energy being captured via a rigid structural component oriented substantially perpendicularly with respect to the waves, thereby allowing the rigid structural component to capture potential energy derived from the waves. However, it has long been recognized that the power-generation potential of harvesting wave energy faces challenges when huge wave forces encounter the rigid structural component.

To capture vast amounts of energy, the rigid structural component must increase in size; however, as the length of the energy collection device along a wave front increases, the forces on the structure become significantly larger. While functioning, these forces acting on the capturing structure results in fragile structures that are prone to structural damage, particularly during ocean storms. In an example, the PELAMAS WEC (wave energy capture) device deployed offshore in Portugal is designed for large-scale offshore energy collection. However, the device typically was disabled during storms, and has been removed from its moorings in recent years. Similarly, WECS deployed in nearshore tests have suffered a series of terminated tests due mechanical failures caused by wave action.

Attempts have been made to utilize hybrid offshore-and-onshore capture systems for capturing head-driven potential energy derived from tidal changes, such as those described in U.S. Pat. No. 10,514,020. While such systems are configured for continuous energy capture, they are limited in that the potential energy capture occurs based on tidal changes which happen gradually over of the course of high-tide to low-tide cycles. Specifically, the tide cycles only twice per day, resulting in a pressure differential reversal only twice per day as well. Moreover, by implementing a hybrid onshore-and-offshore system, such systems generally have a larger footprint and are limited to deployment in areas which can accommodate both onshore components and offshore components.

Accordingly, what is needed is a rigid and structurally-sound system that optimally and continuously extracts potential energy derived from waves, rather than relying on tidal movement, with minimal downtime and with minimal or no adverse environmental effects. For example, whereas tides cycle only twice per day, waves with a constant period of 10 seconds cycle 720 times per hour and 17,280 times per day, resulting in many opportunities to capture potential energy from wave motion. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a system that optimally and continuously extracts potential energy derived from waves with minimal downtime and with reduced negative environmental effects, thereby allowing for the extraction of wave energy in nontraditional areas, is now met by a new, useful, and nonobvious invention.

The novel closed offshore dual-bladder continuous energy extraction system includes a first offshore bladder that is spaced apart from and in fluidic communication with a second offshore bladder. The second offshore bladder is spaced apart from a shore of a body of water, such that the second offshore bladder is disposed between the shore of the body of water and the first offshore bladder. In an embodiment, the first offshore bladder is spaced apart from the second offshore bladder by a distance equal to one half of a wavelength of a dominant wave of a deployment area surrounding the body of water. In an embodiment, wherein each of the first offshore bladder and the second offshore bladder is disposed at a location of the body of water the includes a depth of between five and ten meters.

An amount of fluid is disposed within at least one of the first offshore bladder and the second offshore bladder. In an embodiment, each of the first offshore bladder and the second offshore bladder is made of a compliant material. One or more of the first offshore bladder and the second offshore bladder may be oversized to be adapted to contain a total volume of the fluid within the system.

A conduit system is secured to each of the first offshore bladder and the second offshore bladder, forming a closed system between the first offshore bladder, the second offshore bladder, and the conduit system. A gear system is disposed within the conduit system and disposed between the first offshore bladder and the second offshore bladder. The gear system includes a rack having a plurality of adjacent teeth and a gear residing within at least one of the plurality of adjacent teeth of the rack. In an embodiment, a piston head is disposed within the conduit system. The piston head is disposed between the gear system and the first offshore bladder, such that the piston head is configured to translate between the gear system and the first offshore bladder, such that the amount of fluid is capable of translation from the second offshore bladder to the first offshore bladder.

The amount of fluid is configured to translate between the bladders via the conduit system. Based on a pressure differential between the first offshore bladder and the second offshore bladder resulting from a difference between a crest and a trough of a wave external to the closed offshore system, the amount of fluid translates within the conduit system, thereby translating the pinion with respect to the rack and resulting in captured potential energy.

In an embodiment, a funnel is disposed between the first offshore bladder and the conduit system. The funnel includes a first diameter adjacent to the first offshore bladder that is greater than a second diameter adjacent to the conduit system. As such, a flow of the amount of fluid from the first offshore bladder to the conduit system passes through the funnel, resulting in a convergence force that increases a velocity of the flow of the amount of fluid. Similarly, in an embodiment, a funnel is disposed between the second offshore bladder and the conduit system. The funnel includes a first diameter adjacent to the second offshore bladder that is greater than a second diameter adjacent to the conduit system. As such, a flow of the amount of fluid from the conduit system to the second offshore bladder passes through the funnel, resulting in a divergence force that decreases a velocity of the flow of the amount of fluid.

In an embodiment, one or both of the first offshore bladder and the second offshore bladder resides below a surface of the body of water, thereby reducing a force of the wave external to the system on the bladder. Moreover, in an embodiment, one or both of the first offshore bladder and the second offshore bladder is anchored to a floor of the body of water, thereby reducing a force of the wave external to the system on the bladder.

An object of the invention is to provide for the extraction of potential energy from waves that is not limited to wave energy that does not rely on the slope of an ocean floor or on shut-off valves, thereby expanding the area in which tidal energy can be captured and used as a renewable energy source and expanding the total amount of tidal energy that can be captured.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 2A is a top plan view of an embodiment of the dual-bladder closed system of FIG. 1, showing horizontal flow from a first bladder to a second bladder, in accordance with an embodiment of the present invention.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes a dual-bladder wave energy system that is capable of capturing a continuous supply of energy derived from wave movements for near-shore implementations. Rather than employing an onshore bladder in communication with an offshore bladder, and rather than focusing on capturing more incremental potential energy derived from tidal movement, the present invention continuous captures potential energy from waves via a dual-bladder system employed offshore. By utilizing compliant bladders, the system is capable of capturing energy even during inclement weather conditions without the risk of faults resulting from strong waves. As such, the present invention provides for the efficient and effective capture of potential energy from waves in any weather condition and in any water environment that experiences waves. The present invention will be described in greater detail herein below.

Figure 1:
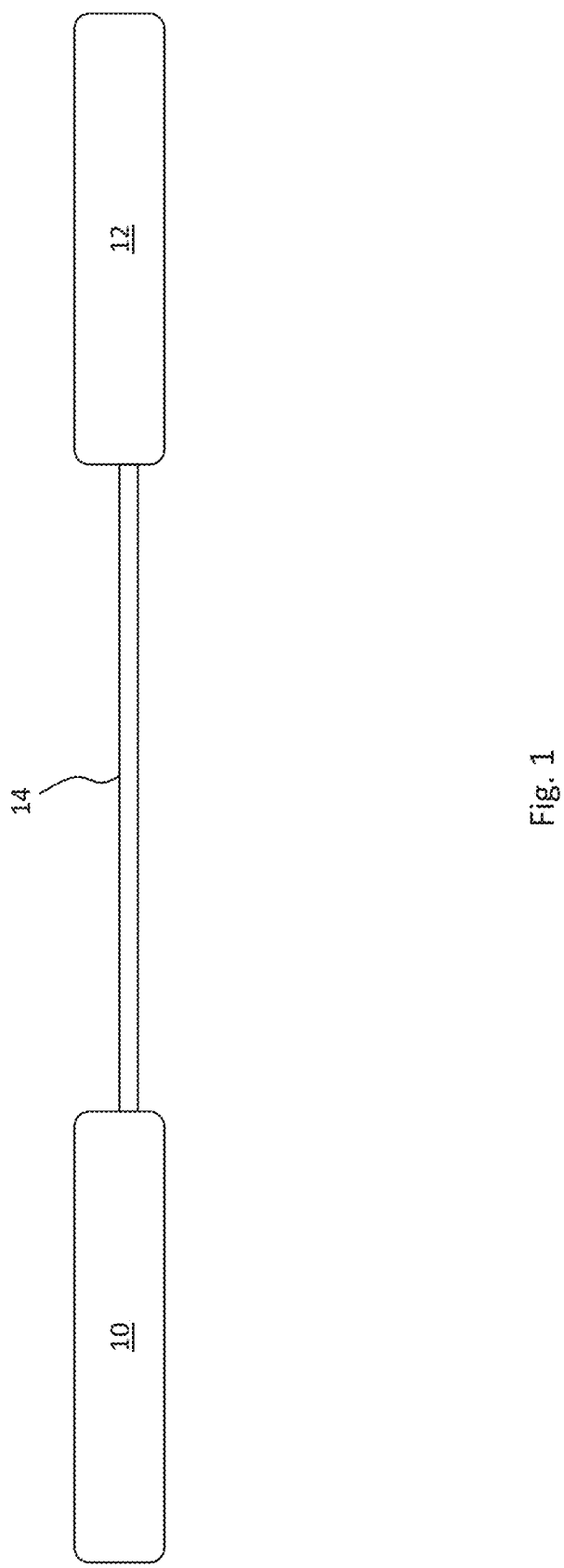
FIG. 1 is a perspective view of a closed offshore dual-bladder system designed to capture a continuous supply of energy derived from wave movements, in accordance with an embodiment of the present invention.

As shown in FIG. 1, the present invention includes a closed offshore dual-bladder system configured to capture potential energy from offshore waves. The system includes first offshore bladder 10 (alternatively referred to as first bladder 10) in fluidic communication with second offshore bladder 12 (alternatively referred to as second bladder 12). To form the closed system, first bladder 10 is fluidically coupled to second bladder 12 via conduit system 14, which is configured to translate a fluid from first bladder 10 to second bladder 12, and vice versa. The operation of first bladder 10, second bladder 12, and conduit system 14 to capture potential energy from waves interacting with the bladders will be described in greater detail herein below.

First bladder 10 is spaced apart from second bladder 12, such that a pressure differential exists between the bladders in operation, based on the movement of waves in the environment surrounding first bladder 10 and second bladder 12. For example, in an embodiment, first bladder 10 and second bladder 12 are spaced apart by a distance that is equal to approximately one half of a wavelength of a dominant wave in a given area, as measured in an orientation that is perpendicular to the wave propagation direction. As used herein, a dominant wave refers to a wavelength of waves as measured at the spectral peak frequency. As such, in an embodiment, second bladder 12 is disposed between first bladder 10 and a shoreline, such that waves traveling toward the shoreline first interact with first bladder 10, and subsequently interact with second bladder 12, before reaching the shoreline.

Moreover, the closed offshore dual-bladder system can be implemented alone or can be scaled to include a plurality of dual-bladder systems, each configured to capture potential energy from waves within a given geographic area. Since the dominant wavelength for a given area changes with the incident wave spectra, multiple systems at varying distances between first bladder 10 and second bladder 12 can be deployed at a given site in order to cover the range of spectral peak wave lengths that occur at the site in an optimal system for power generation.

Figure 2B:
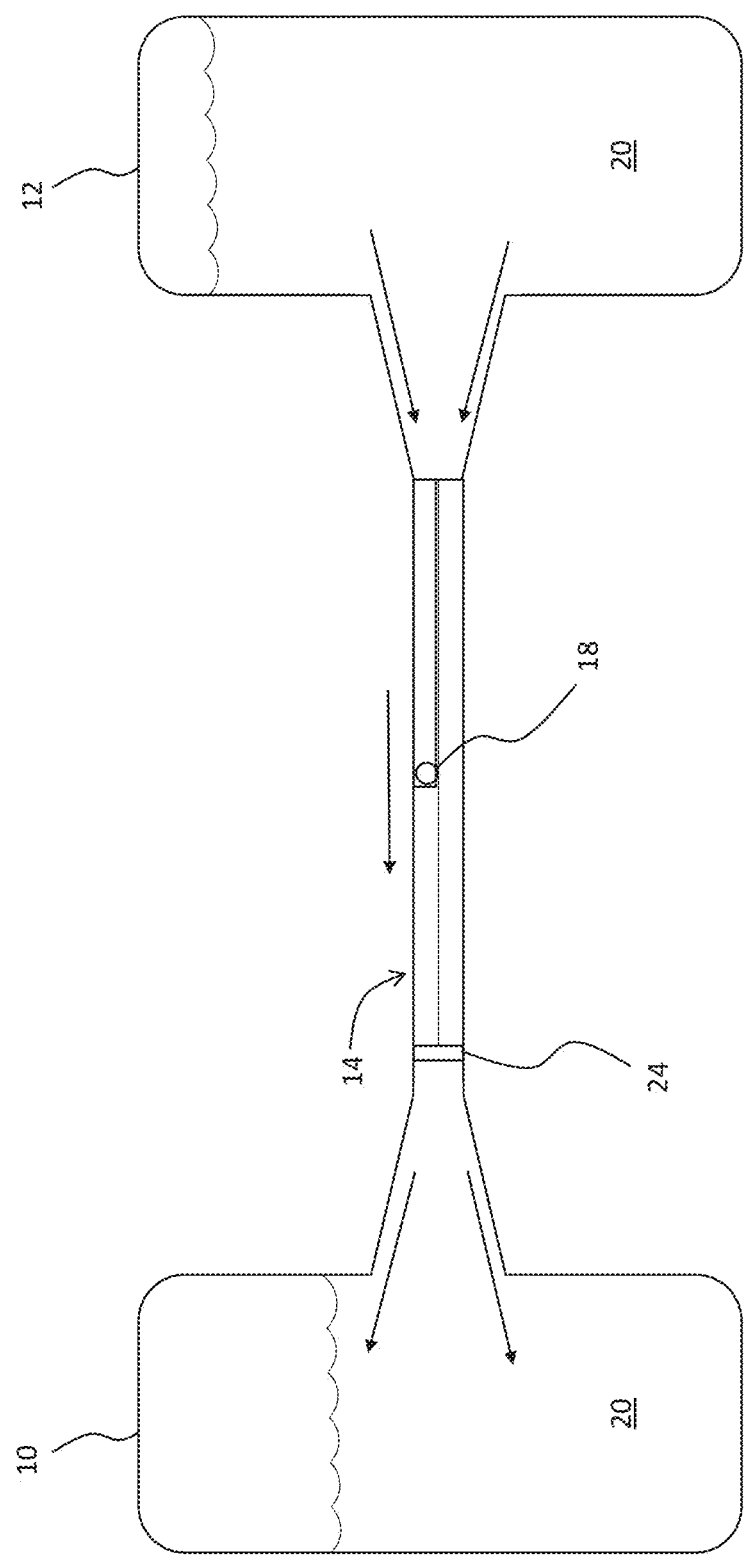
FIG. 2B is a top plan view of the dual-bladder closed system of FIG. 2A, showing horizontal flow from the second bladder to the first bladder, in accordance with an embodiment of the present invention.
Figure 2C:
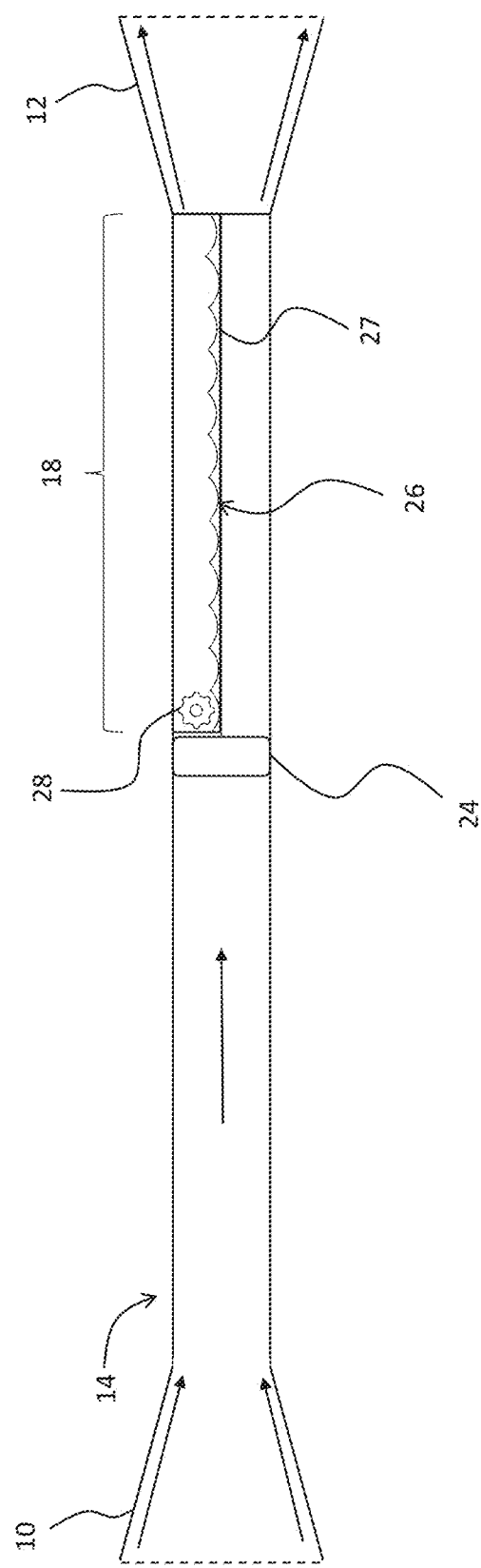
FIG. 2C is a close-up top plan view of the dual-bladder closed system of FIG. 2A, particularly showing the gear system used to capture potential energy during wave movement, in accordance with an embodiment of the present invention.

Turning to FIGS. 2A-2C, an embodiment of the closed dual-bladder system is shown in greater detail. In particular, as shown in FIG. 2A, first bladder 10 is in fluidic communication with second bladder 12 via conduit system 14, as discussed in detail above. A fixed amount of fluid 20 is disposed in at least one of first bladder 10 and second bladder 12; for example, as shown in FIG. 2A, each of first bladder 10 and second bladder 12 include an amount of fluid 20 disposed therein. However, it should be appreciated that at any given moment, either of first bladder 10 or second bladder 12 can contain the entire volume of fluid 20 housed within the system at any given time. To that end, each of first bladder 10 and second bladder 12 is made of a compliant material that is capable of housing the total volume of fluid 20 therein. Moreover, the compliant nature of each of first bladder 10 and second bladder 12 prevents extreme forces, such as those associated with inclement weather conditions, from interfering with an operation of the system.

Each of first bladder 10 and second bladder 12 is in fluidic communication with each other via conduit system 14. Moreover, a connection point between first bladder 10 and conduit system 14, as well as a connection point between second bladder 12 and conduit system 14, forms a funnel shape with a greater diameter on the bladder side of the connection, and a smaller diameter on the conduit side of the connection. The result of the funnel shape is that convergence forces act on fluid 20 as fluid 20 enters a smaller area, thereby accelerating a velocity of fluid 20; similarly, divergence forces act on fluid 20 as fluid 20 enters a larger area, thereby decelerating a velocity of fluid 20. For example, as shown in FIG. 2A, convergence forces act on fluid 20 as fluid 20 leaves first bladder 10 and enters conduit system 14 in a flow direction toward second bladder 12. Moreover, as shown in FIG. 2B, convergence forces act on fluid 20 as fluid 20 leaves second bladder 12 and enters conduit system 14 in a flow direction toward first bladder 10. The effect of these convergence and divergence forces will be described herein below.

Referring to FIGS. 2A-2B in particular, the system includes gear system 18 in mechanical communication with piston head 24, each of which is disposed within conduit system 14 between first bladder 10 and second bladder 12. To capture potential energy from waves passing between first bladder 10 and second bladder 12, fluid 20 is driven horizontally through conduit system 14 between the bladders. As fluid 20 translates within conduit system 14, the flow of fluid 20 interacts with both gear system 18 and piston head 24, translating one or more individual gears of gear system 18, as well as piston head 24, horizontally with respect to the flow direction. For example, as shown in FIG. 2A, as fluid 20 translates from first bladder 10 to second bladder 12, the flow of fluid 20 horizontally translates gear system 18 and piston head 24 in a direction toward second bladder 12. Similarly, as shown in FIG. 2B, as fluid 20 translates from second bladder 12 to first bladder 10, the flow of fluid 20 horizontally translates gear system 18 and piston head 24 in a direction toward first bladder 10.

Turning to FIG. 2C in particular, conduit system 14, gear system 18, and piston head 24 are shown in greater detail. The orientation depicted in FIG. 2C includes fluid 20 flowing from first bladder 10 in a direction toward second bladder 12; however, it should be appreciated that similar interactions between components is found in fluid 20 flow in both directions. As shown in FIG. 2C, gear system 18 includes rack 26, which includes a plurality of teeth 27, forming a base component of gear system 18. Each of the plurality of teeth 27 includes a lower valley portion formed between two opposing upper edges. Moreover, gear system 18 includes pinion 28 which is configured to reside within one of the plurality of teeth 27 of rack 26. Gear system 18 includes at least one peripheral edge which is disposed between first bladder 10 and second bladder 12, with piston head 24 residing between the peripheral edge and first bladder 10. In operation, the peripheral edge of gear system 18 prevents piston head 24 from translating past gear system 18 in a direction toward second bladder 12, such that piston head 24 is capable of horizontal translation only between first bladder 10 and the peripheral edge of gear system 18.

As fluid 20 translates within conduit system 14 from first bladder 10 toward second bladder 12, fluid 20 interacts with both piston head 24 and gear system 18. In particular, piston head 24 translates to the peripheral edge of gear system 18. In addition, pinion 28 translates along rack 26 between adjacent teeth 27 based on the horizontal force of fluid 20. In an embodiment, a single gear ratio between pinion 28 and rack is used; in alternative embodiments, multiple gear ratios are implemented within gear system 18 to increase the rotation rate of the rotor elements of gear system 18 to a desired performance rate.

The flow of fluid 20 is based on a direction of wave motion outside of the system, which results in a pressure differential between a crest and a trough of the wave; as such, as waves outside of the closed system pass from first bladder 10 toward second bladder 12, fluid 20 within the closed system similarly translates from first bladder 10 to second bladder 12. The force of fluid 20 translates pinion 28 along rack 26 in a direction toward second bladder 12, such that potential energy from the flow of fluid 20, based on external wave movement, is captured by the system. Similarly, as fluid 20 reverses direction during external wave motion, pinion 28 translates along rack 26 in a direction toward first bladder 10, and potential energy from the flow of fluid 20, based on external wave movement, is captured by the system. As such, regardless of the direction of wave motion, the system captures potential energy resulting from the waves.

To accommodate for pressure-decay function of surface waves with depth, in an embodiment, the closed offshore dual-bladder system is placed in relatively shallow water, such as in depths in the range of 5 to 10 meters. At these depths, the reduction of the pressure differential from hydrostatic values is in the range of 0.7-0.9 for typical periods and depths intended for deployment. Water depth also limits the maximum wave height that can propagate into the deployment sites, thereby insulating the system from the effects of extreme inclement weather conditions. Moreover, each of first bladder 10 and second bladder 12 is at least partially submerged below a top surface of the water surrounding the closed offshore dual-bladder system, such that the forces created by the flow of external waves into the side and over the top of these bladders is of a lesser degree than the downward force of the pressure differential of the waves. In an embodiment, one or more of first bladder 10 and second bladder 12 is anchored to a floor of the body of water.

Figure 3A:
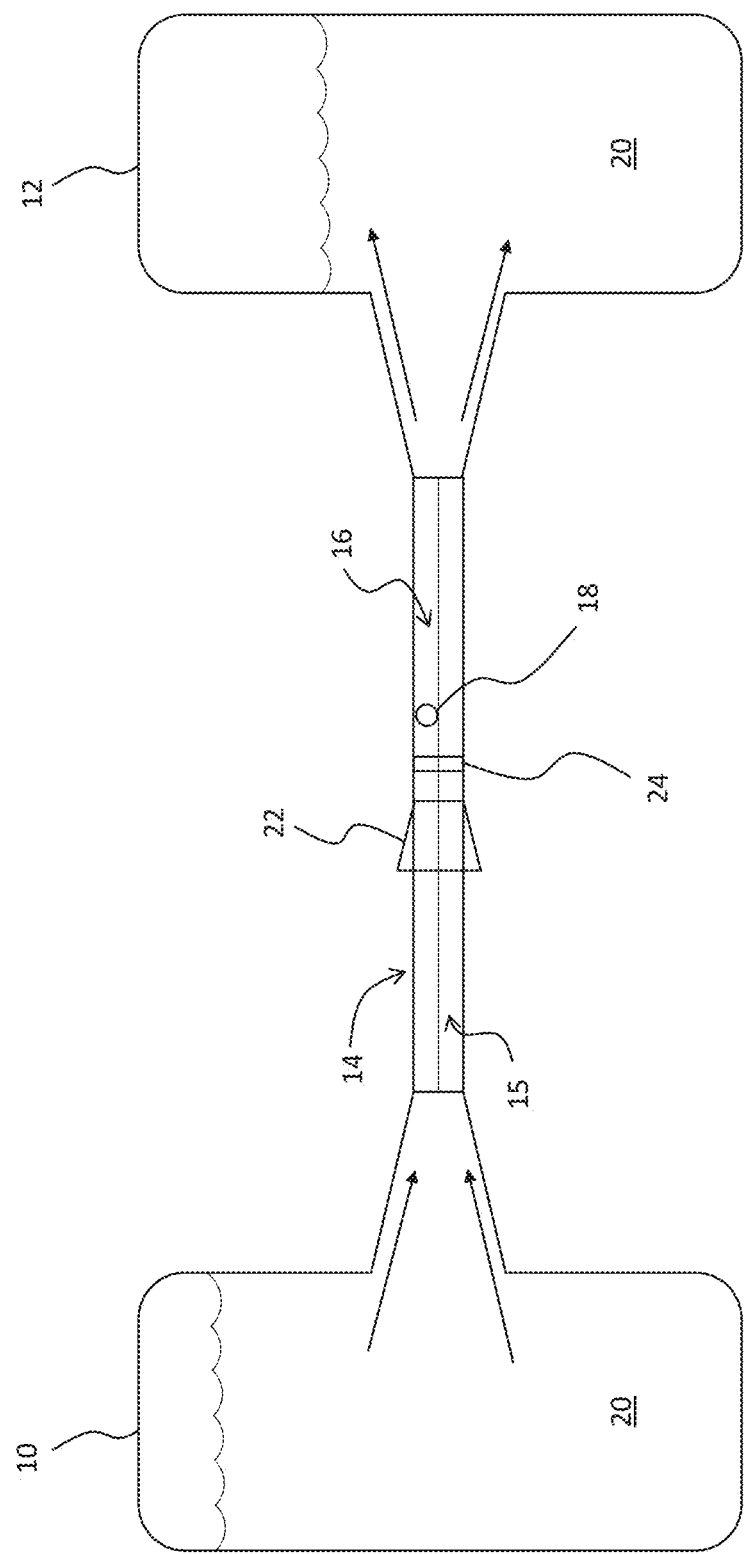
FIG. 3A is a perspective view of an embodiment of the dual-bladder closed system of FIG. 1, including a hydropower turbine and horizontal flow from a first bladder to a second bladder, in accordance with an embodiment of the present invention.
Figure 3B:
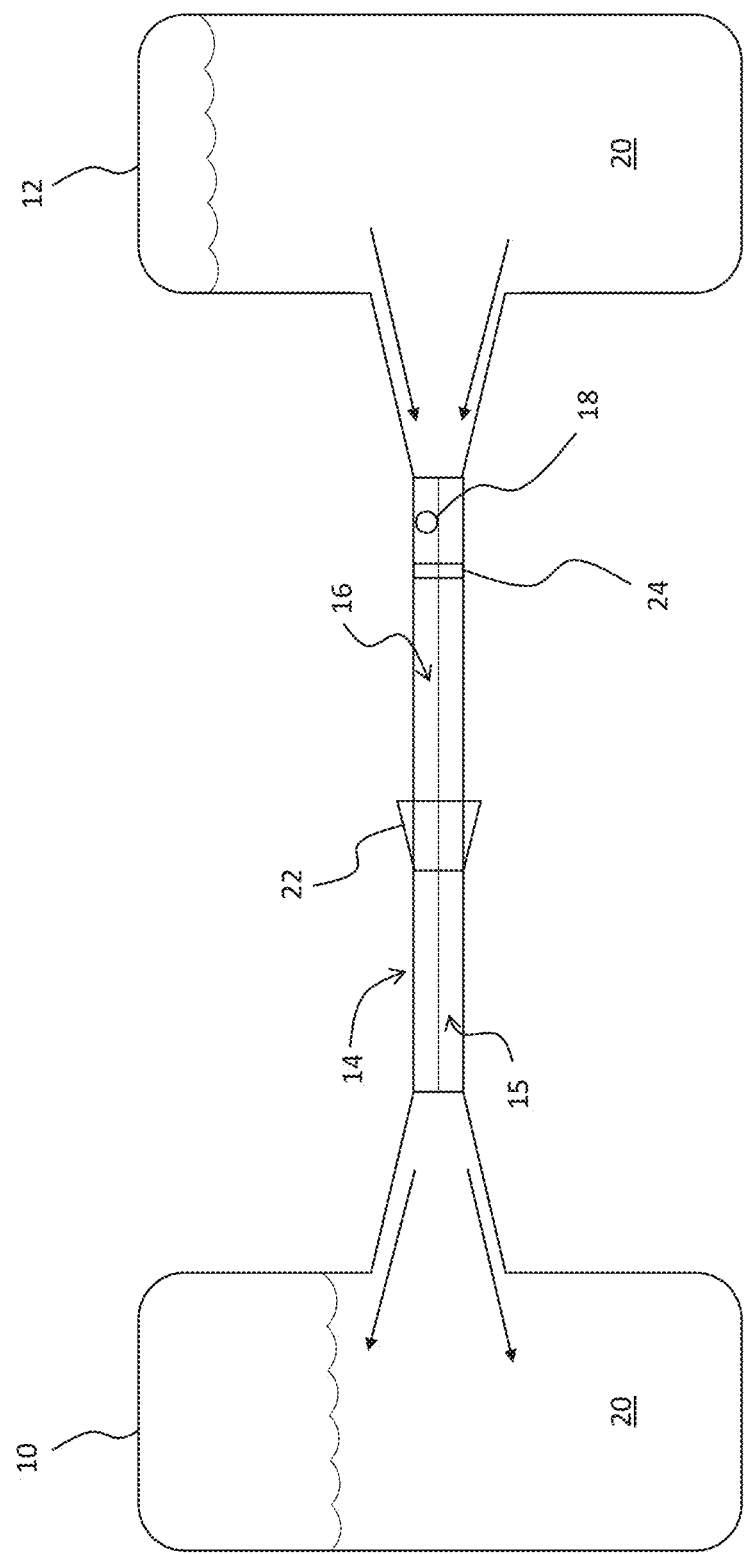
FIG. 3B is a perspective view of the dual-bladder closed system of FIG. 3A, showing horizontal flow from the second bladder to the first bladder, in accordance with an embodiment of the present invention.

As shown in FIGS. 3A-3B, an alternative embodiment of the closed offshore dual-bladder system described in detail above includes first bladder 10 connected to second bladder 12 via conduit system 14, which includes first conduit 15 and second conduit 16. To optimize a flow of fluid 20 within the system, and to capture a greater amount of potential energy by preventing bidirectional flow of fluid 20, an embodiment of conduit system 14 includes a separation wall between first conduit 15 and second conduit 16. As such, each conduit is configured for the flow of fluid 20 in one direction—for example, fluid 20 flows from first bladder 10 to second bladder 12 via first conduit 15, and fluid 20 flows from second bladder 12 to first bladder 10 via second conduit 16.

In the embodiment shown in FIGS. 3A-3B, hydropower turbine 22 (alternatively referred to herein as turbine 22) is disposed between first bladder 10 and second bladder 12, within conduit system 14. As fluid 20 flows between first bladder 10 and second bladder 12, fluid 20 passes through hydropower turbine 22, turning turbine 22, which in turn captures potential energy from the flow of fluid 20 through conduit system 14. It should be appreciated that hydropower turbine 22 can include various components commonly known within the art to help capture potential energy from waves and turn the potential energy into a usable form, such as a generator, such that turbine 22 turns as a result of a pressure differential between first bladder 10 and second bladder 12. Moreover, hydropower turbine 22 can include one or more manifolds on the generator to capture more potential energy from waves by easing the path of fluid 20 through the generator, thereby minimizing the amount of energy lost due to friction or as heat energy.

Figure 4:
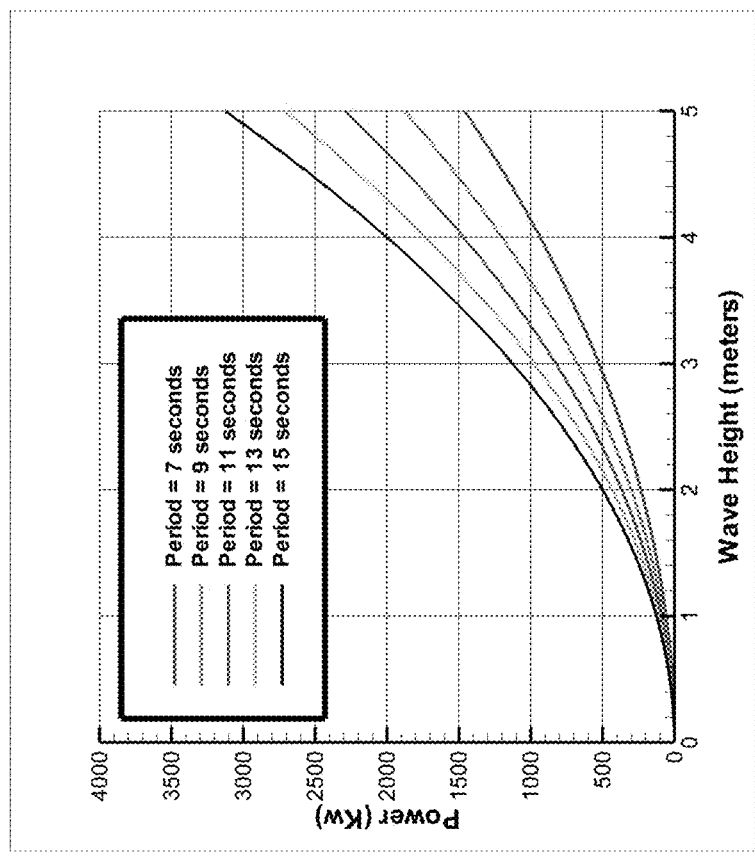
FIG. 4 is a graphical representation of potential energy captured as a function of wave height over various periods of time, in accordance with an embodiment of the present invention.

In operation, the closed offshore dual-bladder system is configured for offshore deployment to capture potential energy from pressure differentials as waves travel between first bladder 10 and second bladder 12, toward and away from a shore. However, the potential energy is not captured by the wave motion itself, but rather by the space-time varying pressures between crests and troughs of waves, and the effect of the crests and troughs on the stationary closed offshore dual-bladder system, particularly on the fluid 20 disposed therein. In an example of the closed offshore dual-bladder system, if each of first bladder 10 and second bladder 12 is 30 meters wide in the along crest direction, an optimal distance between the bladders may be a collection distance of 30 meters through which the wave energy flux is orthogonal to the system. If the energy flux passes the bladder at a non-orthogonal angle, the capture width is reduced by a factor equal to the cosine of the angle between the actual energy flux direction. FIG. 4 shows the energy flux rate passing by a 30-meter bladder, assuming an average directional reduction of 30% and an overall system efficiency of 0.5.

As shown in FIG. 4, a 1.5-meter wave height with a wave period (spectral peak wave period) passing over the closed offshore dual-bladder system generates approximately 250 kW of power. At locations in which larger wave heights persist in conjunction with longer wave periods, the average power production rate for a single system is as high as 1000 kW, i.e., 1 Megawatt. In a deployment along the west coast of the United States during winter months, such a closed offshore dual-bladder system is capable of generating 180,000-720,000 kW-hours per month, which is approximately equal to the energy needs for approximately 180-720 households. Moreover, due to the scalability of the system, combining several closed offshore dual-bladder systems results in a multiplicative increase in the rate of power production.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A closed offshore system for continuous extraction of potential energy from waves, the system comprising:
   a first offshore bladder spaced apart from and in fluidic communication with a second offshore bladder, such that the second offshore bladder is spaced apart from a shore of a body of water, and such that the second offshore bladder is disposed between the shore of the body of water and the first offshore bladder;
   a conduit system secured to each of the first offshore bladder and the second offshore bladder, forming a closed system between the first offshore bladder, the second offshore bladder, and the conduit system;
   a gear system disposed within the conduit system and disposed between the first offshore bladder and the second offshore bladder, the gear system including a rack having a plurality of adjacent teeth and a gear residing within at least one of the plurality of adjacent teeth of the rack; and
   an amount of fluid disposed within at least one of the first offshore bladder and the second offshore bladder, the amount of fluid configured to translate between the bladders via the conduit system,
   wherein an external wave exerts a downward force on the second offshore bladder upon reaching the second offshore bladder, resulting in the first offshore bladder residing at a crest of the external wave and resulting in the second offshore bladder residing at a trough of the external wave, the external wave creating a pressure differential between the first offshore bladder and the second offshore bladder, such that the pressure differential results in the system translating the amount of fluid within the conduit system from the first offshore bladder to the second offshore bladder, thereby translating the gear with respect to the rack and resulting in captured potential energy.

2. The system of claim 1, wherein each of the first offshore bladder and the second offshore bladder is made of a compliant material.

3. The system of claim 1, wherein the first offshore bladder is oversized, such that the first offshore bladder is adapted to contain a total volume of the fluid.

4. The system of claim 1, wherein the second offshore bladder is oversized, such that the second offshore bladder is adapted to contain a total volume of the fluid.

5. The system of claim 1, further comprising a funnel disposed between the first offshore bladder and the conduit system, the funnel including a first diameter adjacent to the first offshore bladder that is greater than a second diameter adjacent to the conduit system.

6. The system of claim 5, wherein a flow of the amount of fluid from the first offshore bladder to the conduit system passes through the funnel, resulting in a convergence force that increases a velocity of the flow of the amount of fluid.

7. The system of claim 1, further comprising a funnel disposed between the second offshore bladder and the conduit system, the funnel including a first diameter adjacent to the second offshore bladder that is greater than a second diameter adjacent to the conduit system.

8. The system of claim 7, wherein a flow of the amount of fluid from the conduit system to the second offshore bladder passes through the funnel, resulting in a divergence force that decreases a velocity of the flow of the amount of fluid.

9. The system of claim 1, further comprising a piston head disposed within the conduit system, the piston head disposed between the gear system and the first offshore bladder, wherein the piston head is configured to translate between the gear system and the first offshore bladder, such that the amount of fluid is capable of translation from the second offshore bladder to the first offshore bladder.

10. The system of claim 1, wherein the first offshore bladder resides below a surface of the body of water, thereby reducing a force of the wave external to the system on the first offshore bladder.

11. The system of claim 1, wherein the second offshore bladder resides below a surface of the body of water, thereby reducing a force of the wave external to the system on the second offshore bladder.

12. The system of claim 1, wherein the first offshore bladder is anchored to a floor of the body of water, thereby reducing a force of the wave external to the system on the first offshore bladder.

13. The system of claim 1, wherein the second offshore bladder is anchored to a floor of the body of water, thereby reducing a force of the wave external to the system on the second offshore bladder.

14. The system of claim 1, wherein each of the first offshore bladder and the second offshore bladder is disposed at a location of the body of water that includes a depth of between five and ten meters.

15. The system of claim 1, wherein the first offshore bladder is spaced apart from the second offshore bladder by a distance equal to one half of a wavelength of a dominant wave of a deployment area surrounding the body of water.

16. A closed offshore system for continuous extraction of potential energy from waves, the system comprising:
a first offshore bladder made of a compliant material;
a first funnel in fluidic communication with the first offshore bladder and a conduit system disposed adjacent to the first offshore bladder, the funnel including a first diameter adjacent to the first offshore bladder that is greater than a second diameter adjacent to the conduit system;
the conduit system including a gear system disposed therein, the gear system including a rack having a plurality of adjacent teeth and a gear residing within at least one of the plurality of adjacent teeth of the rack;
a second offshore bladder made of a compliant material, the second offshore bladder spaced apart from the first offshore bladder and in fluidic communication with the conduit system via a second funnel, the second funnel including a first diameter adjacent to the second offshore bladder that is greater than a second diameter adjacent to the conduit system; and
an amount of fluid disposed within at least one of the first offshore bladder and the second offshore bladder, the amount of fluid configured to translate between the bladders via the conduit system,
wherein the second offshore bladder is disposed between a shore of a body of water and the first offshore bladder,
wherein an external wave exerts a downward force on the second offshore bladder upon reaching the second offshore bladder, resulting in the first offshore bladder residing at a crest of the external wave and resulting in the second offshore bladder residing at a trough of the external wave creating a pressure differential between the first offshore bladder and the second offshore bladder, such that the pressure differential results in the system translating the amount of fluid within the conduit system from the first offshore bladder to the second offshore bladder, thereby translating the gear with respect to the rack and resulting in captured potential energy, and
wherein the first funnel imparts a convergence force of the translation of the amount of fluid from the first offshore bladder to the second offshore bladder that increases a velocity of the flow of the amount of fluid.

17. The system of claim 16, wherein each of the first offshore bladder and the second offshore bladder is oversized, such that each of the first offshore bladder and the second offshore bladder is adapted to contain a total volume of the fluid.

18. The system of claim 16, wherein each of the first offshore bladder and the second offshore bladder resides below a surface of the body of water, thereby reducing a force of the wave external to the system on each of the first offshore bladder and the second offshore bladder.

19. The system of claim 16, wherein the first offshore bladder is spaced apart from the second offshore bladder by a distance equal to one half of a wavelength of a dominant wave of a deployment area surrounding the body of water.

20. The system of claim 16, further comprising a piston head disposed within the conduit system, the piston head disposed between the gear system and the first offshore bladder, wherein the piston head is configured to translate between the gear system and the first offshore bladder, such that the amount of fluid is capable of translation from the second offshore bladder to the first offshore bladder.

\* \* \* \* \*